Jan. 24, 1956 M. A. GILMAN ET AL 2,732,449
PRESSURE CONTROLLED SWITCH ACTUATING MECHANISM
Filed Aug. 13, 1953 2 Sheets-Sheet 1
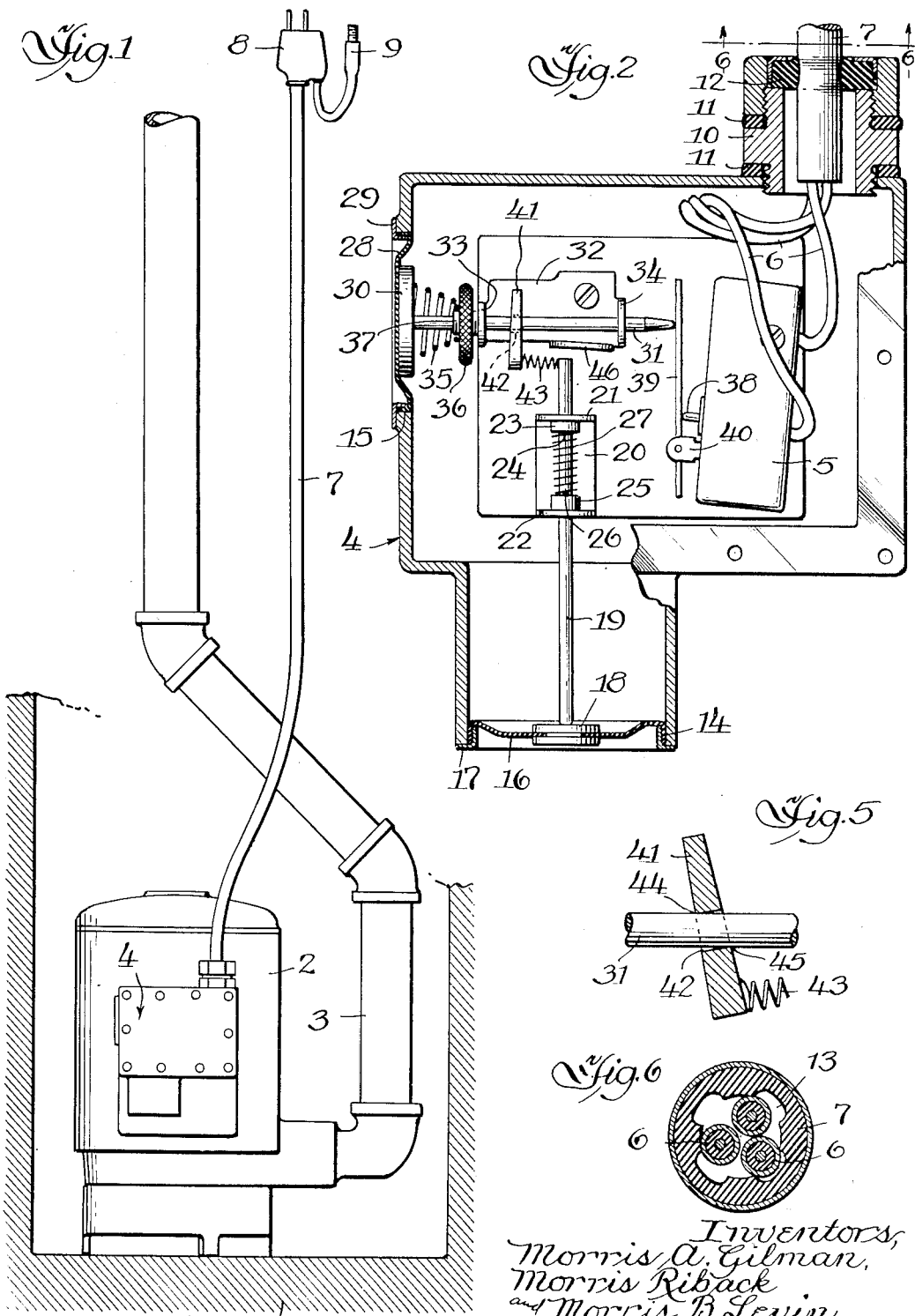
Inventors,
Morris A. Gilman,
Morris Riback
and Morris B. Levin
By: Benjamin Schlosser
Atty.

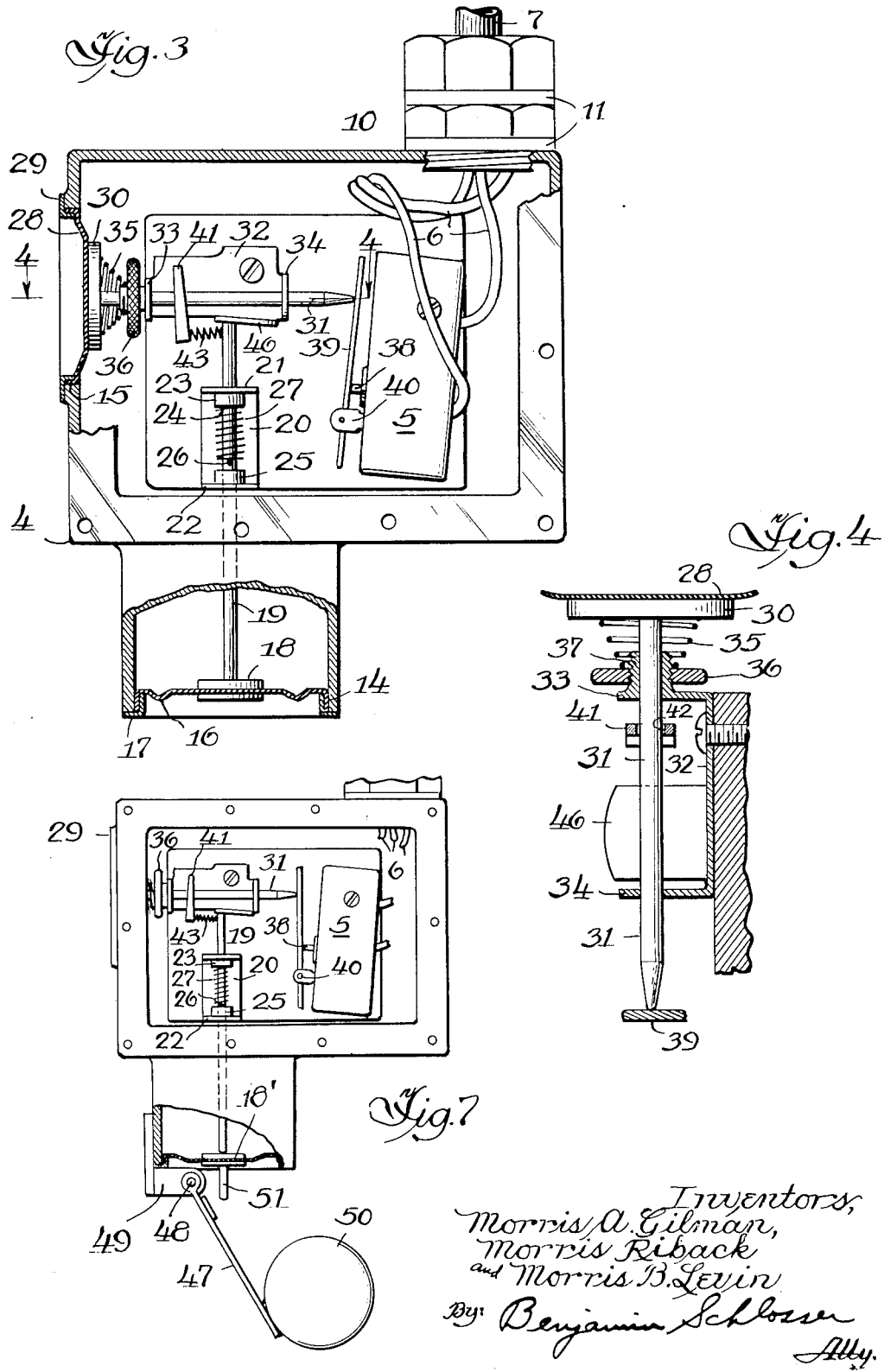

United States Patent Office 2,732,449
Patented Jan. 24, 1956

2,732,449

PRESSURE CONTROLLED SWITCH ACTUATING MECHANISM

Morris A. Gilman and Morris Riback, Chicago, and Morris B. Levin, Skokie, Ill., assignors to Expert Tool and Manufacturing Company, Chicago, Ill., a partnership Application August 13, 1953, Serial No. 374,042

7 Claims. (Cl. 200—81.5)

This invention relates to a pressure controlled switch actuating mechanism and is particularly designed for use with a sump or cistern pump, but may be used with apparatus of different types wherever an electrical switch is used to start and stop a motor in response to changes in pressure.

Pumps of the type with which this invention is concerned are operated intermittently, in accordance with the amount of water or other liquid accumulated. When the liquid reaches a certain level the switch is actuated automatically to start the operation of the pump, and when the liquid level has been lowered sufficiently the switch is again actuated automatically to stop the pump.

One serious disadvantage of switch actuating mechanisms heretofore known for starting and stopping a pump automatically in accordance with the liquid level is the limited range of liquid depth through which the switch is effective. This range varies with different equipment, the maximum range being about ten inches. In other words, after the liquid level is reached at which the switch is actuated, the pump can reduce the level only about ten inches before it is shut off automatically. The result of this limitation is that the liquid level again reaches the point where the switch is again operated to start the pump very shortly after it has been stopped. Accordingly, the pump is subjected to excessive wear because of the frequency of its operation.

In the mechanism constructed in accordance with our invention the switch is not actuated until a substantially higher liquid level is reached. Once the pump has been started it continues to operate until the liquid level has been reduced considerably more than the ten inches through which the prior art devices operate. Our invention includes means for preventing actuation of the switch to shut off the pump motor until a desired predetermined liquid level is reached which may be thirty inches below the liquid level at which the pump is started. This structure reduces the frequency of starting and stopping the pump considerably, and thereby reduces the wear and prolongs the useful life of the pump. In our improved structure the pressure responsive means for stopping the pump motor is positioned at a different level than the means for starting the motor.

When pumps are submersed in the water accumulated in the sump or cistern the switch housing must be sealed against the water, and it has been found that the temperature of the water often affects the pressure of he air contained within the switch housing, thereby making the actuation of the switch erratic. Our invention includes means for keeping the air within the switch housing at atmospheric pressure regardless of the temperature of the surrounding water so that the actuation of the switch is accurately controlled and occurs at the predetermined water levels for which the mechanism is set.

The structure by means of which the above and other advantages of the invention are attained will be described in detail in the following specification, taken in conjunction with the accompanying drawings, showing two preferred illustrative embodiments of the invention, in which:

Fig. 1 is a side elevation showing one embodiment of the invention as applied to a pump seated on the bottom of a sump;

Fig. 2 is an enlarged cross sectional view of the switch housing showing the switch actuating mechanism when the switch is off and the pump is not operating;

Fig. 3 is a view similar to Fig. 2 with the switch on and the pump in operation;

Fig. 4 is a detail sectional view showing the means for mounting the switch actuating rod;

Fig. 5 is a detail sectional view showing the clutch locking the switch actuating rod against movement in releasing direction;

Fig. 6 is a cross sectional view, taken along the line 6—6 of Fig. 2, showing the cord structure for bleeding the air within the switch housing to the atmosphere for maintaining atmospheric pressure within the switch housing; and Fig. 7 is a view similar to Fig. 2 showing another embodiment of the invention.

Referring to the drawings, the reference numeral 1 indicates a sump in which a pump 2 is positioned. A pipe line 3 is connected to the pump for the discharge of water from the sump. A switch housing 4 is rigidly secured to one side of the pump. An electrical switch 5 mounted within housing 4 is connected to the motor for operating the pump in conventional manner. The wiring 6 for the switch and motor passes through a conduit 7 and is provided at its free end with a plug 8 adapted to fit in an electrical outlet. A ground connection 9 is also provided, as shown in Fig. 1. The conduit 7 terminate adjacent the plug 8 and therefore extends from the housing to a point outside the sump in which the pump is seated. The lower end of conduit 7 extends through a packing nut 10 threaded into an aperture in one wall of the switch housing. Gaskets 11 and 12 seal the end of the conduit in the housing so that no water may leak into the switch housing.

The conduit 7 is provided with an aperture 13 larger than the total diameter of the wiring 6 passing therethrough, so that an air passageway extends along the entire length of the electric cord. Since the conduit terminates slightly in front of plug 8 the air from the housing is in constant communication with the atmosphere. If the temperature of the water surrounding the housing raises the pressure of the air in the housing above atmospheric pressure some of the air will bleed through the aperture 13 of the conduit until the air pressure is equalized. If the water is cold enough to decrease the pressure of the air within the housing, air will be forced through aperture 13 from the atmosphere until the air pressure is equalized. The maintenance of the air within the housing at atmospheric pressure is important because it permits accurate control of the movement of diaphragms, hereinafter described, which actuate the switch 5 at predetermined points relative to the height of the liquid level. If this condition of atmospheric pressure did not exist within the housing, the pressure against the diaphragms would be variable, depending upon the temperature of the water or other liquid adjacent the diaphragms, and the actuation of the switch would be erratic. The exact limits of the liquid level at which the switch would be actuated could not be predicted.

Housing 4 is provided with openings 14 and 15 at different levels. Opening 14 is positioned close to the bottom of sump 1 and is sealed by a flexible waterproof diaphragm 16 adapted to be operated when the liquid level is comparatively low. Diaphragm 16 is secured in place across opening 14 in any suitable manner, as by a metal rim 17. A rigid disk 18, secured to the central portion of the diaphragm abuts one end of a rod 19 extending vertically in the housing 4. Rod 19 is held in upright position by a bracket 20 rigidly secured to the housing and having two apertured flanges 21, 22, through which the rod extends. A pair of collars 23 and 25 encircle rod 19 between flanges 21 and 22. A coiled compression spring 27 encircling rod 19 between collars 21 and 22 has one end bearing against the undersurface 24 of collar 23 and its other end bearing against a pin 26 projecting from rod 19 above collar 25. Spring 27 urges the rod 19 downwardly into contact with the rigid disk 18.

When the water or other liquid rises past the level of the bottom of housing 4, it exerts pressure against the diaphragm 16 and moves the rod 19 upwardly against the action of spring 27. When the liquid level recedes below the diaphragm, spring 27 moves rod 19 downwardly.

The opening 15, which is positioned in one side of housing 4 adjacent its upper edge, is sealed by a flexible waterproof diaphragm 28 secured by a metal rim 29. A rigid disk 30, secured to the central portion of diaphragm 28 in any suitable manner, abuts one end of a horizontally extending rod 31 held in place by a bracket 32 rigidly secured to the housing 4. The bracket 32 is provided with a pair of apertured flanges 33, 34, through which the rod 31 extends. A spring 35 encircling one end of the rod 31 has one end bearing against the inner surface of disk 30 and its other end bearing against a nut 36 threaded on a boss 37 projecting laterally outwardly from flange 33. The boss is apertured for rod 31 to pass therethrough. The flange 33 and boss 37 are rigidly fixed relative to housing 4, and therefore the force of the spring 35 urges the disk 30 outwardly relative to the housing.

As the water or other liquid rises past the diaphragm 28 it exerts lateral pressure thereagainst, tending to move disk 30 inwardly against the action of spring 35. The compression of spring 35 may be varied by lateral movement of nut 36 on boss 37 to predetermine the pressure that is necessary to move diaphragm 28 inwardly. If it is desired to have rod 31 moved to the right, as viewed in Fig. 2, when the water in the sump is at a comparatively low level, the nut 36 is moved to the right as far as possible, so that a minimum amount of lateral pressure from the water will move disk 30 inwardly. As the nut 36 is threaded to the left the compression of spring 35 is increased, thereby necessitating greater pressure to move the disk 30 inwardly. The greater the pressure required to move the disk 30 inwardly, the higher the water level in the sump must rise before the water can build up sufficient pressure to move the disk. In this manner the height of water which must accumulate in the sump before the switch is actuated may be predetermined.

The switch 5 has a projecting stud 38 which must be pressed inwardly to actuate the switch. A plate 39, pivoted to ears 40 projecting from the switch, abuts the end of stud 38 and one end of rod 31 so that when rod 31 is moved to the right, as seen in Fig. 2, it moves plate 39 pivotally to press the stud inwardly.

A lock clutch 41, in the form of a wedge shaped disk, is loosely mounted on rod 31 beween flanges 33 and 34. The clutch 41 is provided with an aperture 42 slightly larger in diameter than rod 31. A spring 43 is secured at one end to one end of the clutch and at its other end to the end of rod 19. The spring 43 is comparatively stiff so that when rod 19 is moved upwardly it tilts the clutch plate 41 in the position shown in Fig. 5. In this position the rod 31 is free to move to the right, but can not move to the left because the sharp edges 44 and 45 at the diagonally opposite portions of aperture 42 will dig into the rod 31 and bind it against movement in that direction as the inclination of the lock clutch 41 towards the left is increased. Movement of the rod 31 towards the right tends to move the lock clutch towards its upright position so that it will not interfere with such movement.

The actuation of the switch 5 is very simple. As the water level rises in the sump past the plane of diaphragm 16 the pressure of the water moves rod 19 upwardly, against the action of spring 27, thus forcing clutch 41 into the inclined position of Fig. 5. A horizontal flange 46 extending forwardly from the lower edge of bracket 32 limits the upward movement of rod 19. When the water level reaches the predetermined height for which the mechanism is set, the pressure of the water moves disk 30 towards the right against the action of spring 35, thus moving rod 31 to the right to actuate the switch 5 which controls the motor of the pump by which the water is pumped from the sump. When the water recedes below the level of diaphragm 28 the water pressure against the diaphragm is released, but the rod 31 is prevented from moving to the left by the clutch 41, and the switch is held in its closed position until the water level recedes below diaphragm 16. When the pressure of water against diaphragm 16 is released, the spring 27 forces rod 19 downwardly and the spring 43 moves clutch 41 into upright position, and spring 35 then moves disk 30 back into its normal position. The stud 38 is spring pressed and will move to open position, moving rod 31 and plate 39 towards the left, thus stopping the motor of the pump. As the level of the water or other liquid increases, the cycle will be repeated.

The embodiment shown in Fig. 7 differs from the embodiment of Figs. 1 to 6 only in that a float lever has been added to provide means for moving rod 19 upwardly under very light pressure. A lever 47 is pivoted, as indicated at 48, to a suitable bracket 49. A float 50 is secured to the free end of lever 47. A stud 51 projects downwardly from disk 18'. The ratio of the lever 47 is about 6 to 1 so that a very slight raise of the level of the water or other liquid moves float 50 upwardly to move the clutch 41 into its position shown in Fig. 5.

From the foregoing it will be seen that we have devised accurate means for actuating an electrical switch to start and stop a motor at predetermined points so as to control the amount of water or other liquid that can accumulate in a sump or cistern, without excessive starting and stopping of the pump operated by such motor.

Although we have described two embodiments of our invention in considerable detail, it will be understood that the description is intended to be illustrative, rather than restrictive, as many details of the invention may be modified or changed without departing from the spirit or scope of our invention. Accordingly, we do not desire to be restricted to the exact structures described, except as limited by the appended claims.

We claim:

1. A switch actuating mechanism comprising a rod, pressure responsive means for moving said rod axially into position to close said switch, an annular disk clutch encircling said rod, a second rod, said second rod being operatively connected to said clutch, and separate pressure responsive means for moving said second rod to tilt said clutch, said clutch in such tilted position providing clearance for axial movement of said first rod only towards switch closing position and binding against said first rod to prevent movement thereof in the opposite direction.

2. In combination with a switch, a pair of rods each movable axially at right angles to the other, one of said rods being movable to actuate said switch, separate pressure responsive means to move each of said rods, an annular disk clutch encircling said one rod, said other rod being operable to move said clutch into position to hold said one rod against axial movement in one direction.

3. In combination with a housing, a switch mounted in said housing, a pair of apertures at different levels in said housing, a diaphragm sealing each of said apertures against water, a pair of rods each having an end positioned adjacent one of said diaphragms, an annular disk clutch encircling one of said rods, said other rod being operatively connected to said clutch and movable axially responsive to pressure against the diaphragm adjacent its end to tilt said clutch relative to said one rod, said one rod being movable axially responsive to pressure against the diaphragm adjacent its end to close said switch, said clutch in tilted position being effective to hold said one rod in switch closing position.

4. In combination with a housing, a switch mounted in said housing, a pair of apertures at different levels in said housing, a diaphragm sealing each of said apertures against water, a pair of rods each having an end positioned adjacent one of said diaphragms and extending perpendicularly to the plane of said diaphragm, an annular disk clutch encircling one of said rods, said other rod being operatively connected to said clutch and movable axially responsive to pressure against the diaphragm adjacent its end to tilt said clutch relative to said one rod, said one rod being movable axially responsive to pressure against the diaphragm adjacent its end to close said switch, said clutch in tilted position being effective to hold said one rod in switch closing position, and spring means to vary the resistance of said diaphragm adjacent the end of said first rod.

5. In combination with a sealed housing adapted to be submersed in water, a switch, a conduit for carrying wiring from said switch to a source of electrical current, said wiring conduit having an air passageway extending from within said housing to the atmosphere to maintain air within said housing at atmospheric pressure, a pair of rods in said housing, pressure responsive means engaging one of said rods to move it into switch actuating position upon application of a predetermined pressure against said means, a clutch mounted on said one rod, and separate pressure responsive means engaging said second rod, said second rod being operable to move said clutch into holding position to prevent movement of said one rod from switch actuating position upon application of a lower pressure against said last mentioned pressure responsive means.

6. In combination with a sealed housing adapted to be submersed in water, a switch, a depressible stud projecting from said switch for closing said switch, a plate pivoted to said switch and engaging said stud, a rod having one end engaging said plate, pressure responsive means engaging the opposite end of said rod and operable to move said rod against said plate to depress said stud, a clutch on said rod, a second rod operatively connected to said clutch, and separate pressure responsive means engaging said second rod to move said clutch into holding position against said first rod to prevent movement of said stud from switch closing position.

7. In combination with a sealed housing adapted to be submersed in water, a switch, a depressible stud projecting from said switch for closing said switch, a plate pivoted to said switch and engaging said stud, a rod having one end engaging said plate, pressure responsive means engaging the opposite end of said rod and operable to move said rod against said plate to depress said stud, a spring bearing against said pressure responsive means to regulate its resistance to pressure, a clutch on said rod, a second rod operatively connected to said clutch, and separate pressure responsive means engaging said second rod to move said clutch into holding position against said first rod to prevent movement of said stud from switch closing position.

References Cited in the file of this patent

UNITED STATES PATENTS

| | | |
|---|---|---|
| 415,110 | Johnson | Nov. 12, 1889 |
| 2,141,227 | Schaefer | Dec. 27, 1938 |
| 2,266,799 | Raney | Dec. 23, 1941 |
| 2,376,144 | Levine | May 15, 1945 |